United States Patent [19] [11] 3,906,780
Baldwin [45] Sept. 23, 1975

[54] PARTICULATE MATERIAL DETECTION MEANS

[75] Inventor: Willett F. Baldwin, Dallas, Tex.

[73] Assignee: Mobil Oil Corporation, New York, N.Y.

[22] Filed: Dec. 7, 1973

[21] Appl. No.: 422,618

Related U.S. Application Data

[63] Continuation-in-part of Ser. No. 297,175, Oct. 12, 1972, Pat. No. 3,841,144.

[52] U.S. Cl. ............... 73/61 R; 73/194 A; 310/8
[51] Int. Cl.² ........................................ G01N 15/06
[58] Field of Search ...... 73/61 R, 53, 194 A, 194 B, 73/194 C, 70, 71.5 US, 552, 432 PS; 310/8, 8.1, 9.1, 9.6

[56] References Cited
UNITED STATES PATENTS

| | | | |
|---|---|---|---|
| 3,218,852 | 11/1965 | Scarpa et al. | 73/194 B |
| 3,344,658 | 10/1967 | Heisig et al. | 73/53 |
| 3,473,377 | 10/1969 | Reinecke | 73/194 C |
| 3,580,092 | 5/1971 | Scarpa | 73/194 B |
| 3,680,841 | 8/1972 | Yagi et al. | 73/71.5 US X |
| 3,710,615 | 1/1973 | Johnson et al. | 73/61 R |
| 3,816,773 | 6/1974 | Baldwin et al. | 73/61 R X |

FOREIGN PATENTS OR APPLICATIONS

| | | | |
|---|---|---|---|
| 151,053 | 2/1960 | U.S.S.R. | 73/194 A |
| 1,925,153 | 5/1969 | Germany | 73/194 A |

*Primary Examiner*—Richard C. Queisser
*Assistant Examiner*—Joseph W. Roskos
*Attorney, Agent, or Firm*—C. A. Huggett; Drude Faulconer

[57] ABSTRACT

A means for detecting the presence of particulate material, e.g., sand, in a fluid stream flowing through a conduit, said detection means comprising an acoustical means which is positioned on the outer surface of a substantial bend in said conduit. The detection means has a housing in which a transducer, e.g., piezoelectric means, is freely suspended. The housing is filled with oil to acoustically couple the transducer to the conduit. Particulate material in the fluid stream gives up kinetic energy upon striking the inner surface of said bend in said conduit which in turn excites the transducer to generate an output signal having a frequency component, e.g., 700 kilohertz, which is representative of the particulate material.

10 Claims, 5 Drawing Figures

PARTICULATE MATERIAL DETECTION MEANS

CROSS REFERENCE TO RELATED APPLICATION

This is a continuation-in-part of copending U.S. application Ser. No. 297,175, filed Oct. 12, 1972, now U.S. Pat. No. 3,841,144.

BACKGROUND OF THE INVENTION

This invention relates to a means for detecting the presence of a particulate material in a fluid stream and more particularly to an acoustical means for monitoring the presence of small, particulate material, e.g., sand, in a fluid stream flowing through a conduit.

When fluids are flowed through conduits, it is often desirable for various reasons to monitor the particulate material content, e.g., sand, in the flow stream. For example, in oil and gas production from certain areas, sand is sometimes produced along with the fluid minerals. This entrained sand not only can cause severe erosion of production equipment, but can also cause stoppage of production and sand disposal problems when large quantities of sand accumulate within the production system. If the sand content of the production flow stream can be reliably monitored, various corrective measures may be taken at the proper times which will alleviate several of the above-mentioned problems inherent in sand production.

Several different types of devices have been used or proposed for monitoring or detecting the presence of sand in the produced fluids from a well. One such device monitors the flow stream to determine wear caused by sand entrained therein and is commonly referred to as an erosion probe. One type of erosion probe is one which is inserted directly in the flow stream where the sand will gradually erode through the probe wall at which time the pressure of the flow stream will actuate an alarm or the like to warn the operator that a certain amount of erosion has occurred. However, these devices still involve a time delay between increased sand production and the sounding of an alarm and do not provide a continuous monitoring of the sand content in the flow stream.

Another type of erosion probe is one which is coated with radioactive material and is positioned into the flow stream. The particulate material will erode away the radioactive material which, in turn, changes the radiation reading from the probe. This type of probe is disclosed in U.S. Pat. No. 3,678,273, issued July 18, 1972.

Other devices of this general type are known wherein an acoustical device is lowered down into a well to determine if flow is occurring into the wellbore and/or to determine the location within the wellbore that such flow may be occurring, e.g., see U.S. Pat. Nos. 2,210,417, issued Aug. 6, 1940; 2,396,935, issued Mar. 19, 1946; 3,509,764, issued May 5, 1970; and 3,563,311, issued Feb. 16, 1971. These devices, however, require that production be curtailed while the devices are lowered and operated down the well and accordingly they are unable to continuously monitor the particulate content of the produced fluid stream during normal production operations.

Acoustical devices have also been used as flow meters where flow/no-flow or the amount of flow is of concern as opposed to the monitoring of a particular component of a flow stream, e.g., sand. A typical example of this type of device is disclosed in U.S. Pat. No. 3,580,092, issued May 25, 1971.

In another acoustical type of system for monitoring solids in a flow stream, two transducers are spaced along or about a conduit, one transducer generating a signal which in turn is received by the other of said transducers. The attenuation of the generated signal provides an indication of the particle concentration in the flow stream as it flows between the transducers. An example of this type system is disclosed in U.S. Pat. No. 3,710,615, issued Jan. 16, 1973.

Also, another monitoring system involves positioning a microphonic probe into a flow stream and then listening for the "pings" caused by solids in the flow stream striking the probe, this being the system disclosed in U.S. Pat. No. 2,760,184, issued Aug. 21, 1956.

In applicant's copending U.S. application Ser. No. 297,175, filed Oct. 12, 1972, now U.S. Pat. No. 3,841,144, an acoustical probe is disclosed which is positioned directly in the flow stream. The probe includes a transducer element suspended within the probe which is responsive to the high frequencies generated by small, solid particles, such as sand striking the probe. The output of the probe can then be processed to measure said high frequencies to provide a signal representative of sand in the flow stream. Although this probe is highly effective, there are instances where its use may be limited. One is where an existing flow conduit is positioned so that installation of the probe directly into the flow stream is not feasible. Another is where it is known that high velocity flow streams will contain extremely heavy concentrations of particulate material, e.g., sand-blasting apparatus or instances where large volumes of particulate material are used in oil well fracturing operations. In such instances, a probe directly exposed to the high velocity, heavy sand concentrations would have an undesirably short life due to erosion.

Accordingly, the present invention which is considered a modification of the probe disclosed and claimed in copending U.S. application Ser. No. 297,175, now U.S. Pat. No. 3,841,144, provides a means for monitoring sand while being effectively immune from flow stream erosion.

SUMMARY OF THE INVENTION

The present invention provides a means for continuously monitoring a fluid stream in a conduit to indicate the presence or increased presence of particulate material, e.g., sand, in said fluid stream.

More specifically, the present invention comprises an acoustical detection means which is positioned outside the conduit through which the fluid stream to be monitored flows. The detection means is preferably comprised of a cuplike, cylindrical housing having an open end adapted to be positioned onto said conduit at a point, e.g., on the outside surface of a 90° bend in said conduit, where said fluid stream will forcefully impinge on the inner surface of said conduit. An acoustical transducer is suspended for maximum response within said housing by means of its output lead and ground. The output of the transducer extends from the housing to a point outside said housing. Means is provided for filling the housing with a noncompressible, nonconductive fluid, e.g., oil. The oil effectively couples the transducer to the wall of the conduit without allowing actual physical contact there-between.

The acoustical transducer, e.g., piezoelectric means, has a primary resonant frequency in one of its modes in excess of the 100 kilohertz range, e.g., 700 kilohertz, thereby providing a proper response characteristic necessary for the detection of particulate material as will be further explained below in the detailed description of the invention.

When the detection means is properly positioned on the conduit, the fluid stream which strikes the inner surface of the conduit gives up kinetic energy which in turn causes the acoustical transducer within the oil-filled housing to oscillate to generate a signal having frequency components representative of said kinetic energy. The output signal of the detection means may then be processed through circuitry which filters and amplifies the signal further to render it in some usable format.

DESCRIPTION OF THE PREFERRED EMBODIMENT

Figure 1:
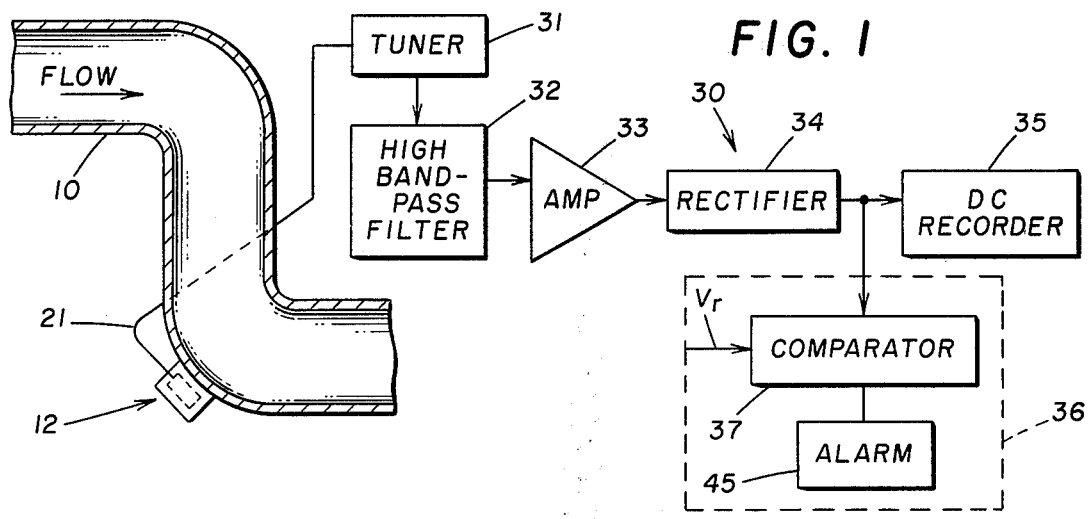
FIG. 1 is an elevated view, partly in section, of the detection means of the present invention along with a block diagram of the circuitry which can be used to process the signal from the probe means.

Referring more particularly to the drawings, FIG. 1 discloses a conduit 10 which is adapted to carry a fluid stream which is to be monitored for particulate material content, e.g., sand. Particulate material detection means 12, as will be explained more fully below, is positioned on conduit 10 at a substantial bend therein, e.g., preferably on the outer surface of a 90° elbow in conduit 10.

Figure 2:
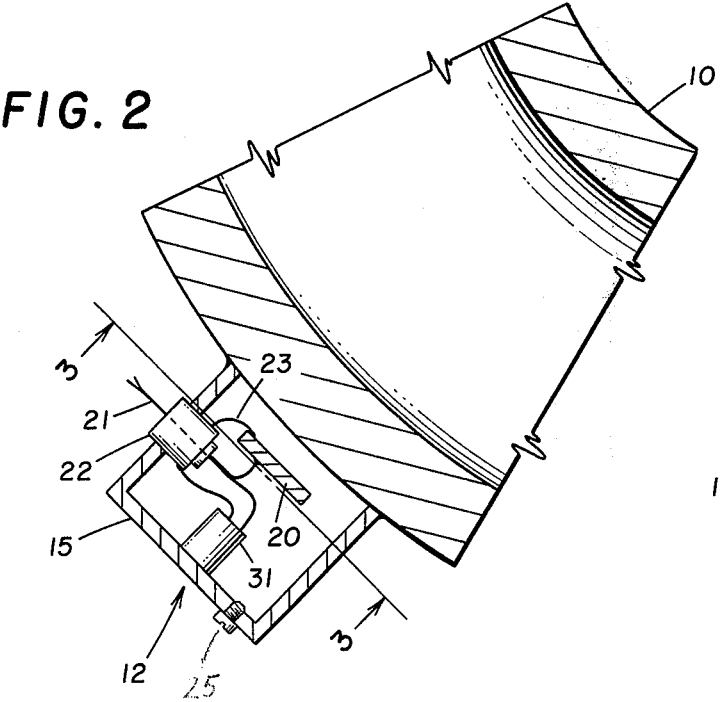
FIG. 2 is an enlarged, sectional view of the detection means of FIG. 1.

Particulate material detection means 12 (FIG. 2) is preferably comprised of cuplike, cylindrical housing 15 which is preferably open at one end. It should be recognized that the shape of housing 15 is not critical. Transducer 20 is freely suspended for maximum sensitivity to vibration by means of its signal output lead 21 and ground lead 23. Output lead 21 effectively passes through electrical connector 22, which in turn is secured through an opening in the sidewall of housing 15, and ground lead 23 is attached to connector 22 as shown in FIG. 2. Leads 21 and 23 are electrically conductive wires which have just enough rigidity to insure that transducer 20 will be suspended within housing 15 without touching the walls of housing 15 and at the same time be flexible enough to offer the minimum resistance to vibration of transducer 20 when said transducer is excited.

An opening in housing 15 which is normally closed by screw 25 or the like is provided to allow housing 15 to be filled completely with a noncompressible, nonconductive fluid, e.g., oil. Where housing 15 has an open end, filling of housing 15 with oil will take place after the housing has been attached in position on conduit 10. If the housing 15 is to be prefilled, a thin flexible membrane (not shown), e.g., rubber, can be used to seal the open end of housing 15. The membrane has to be such so as to completely conform to the contour of conduit 10 when detection means is in an operable position on said conduit and must offer a minimum attenuation of vibrations between the wall of the conduit and transducer 20. It has been found that response by transducer 20 is not as good with a membrane present as it is without one.

When housing 15 is attached to conduit 10 by means of epoxy resin, welding, or other means depending on the material used for housing 15, and said housing is filled, transducer 20 is acoustically coupled to the wall of conduit 10 only by means of the oil within housing 15. The relatively flexible leads 21, 23 allow almost undampened vibration of transducer 20 when same is excited by vibrations of the conduit caused by particulate material impinging on the inner surface thereof.

Transducer 20 is preferably a piezoelectric means which is tuned to the primary resonant frequency of one of its modes so that it provides a peak output at said tuned frequency while attenuating most other frequencies. For the detection of particulate material in accordance with the present invention, this primary resonant frequency has to be above 100 kilohertz range as will be more fully described below. By tuning transducer 20 to a primary resonant frequency, the transducer responds rapidly to the frequencies generated by the kinetic energy given up by the particulate material impinging on the inner surface of conduit 10, and, in turn, produces a signal indicative thereof. The output of transducer means 20 is fed through lead 21 into processing circuitry 30 (FIG. 1) to convert the signal to some usable format.

Figure 4:
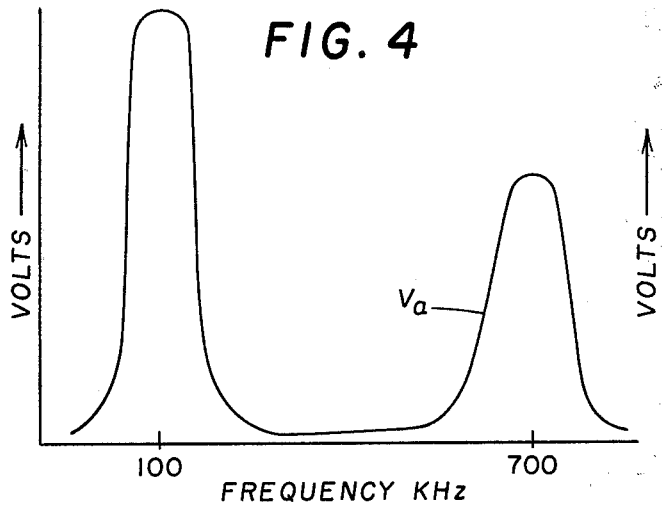
FIG. 4 is a graphic representation of the tuned response curve of the transducer of the detection means in FIG. 2.

An example of transducer 20 is a piezoelectric, ceramic means in the shape of a circular disc (e.g., Vernitron PTZ-5), having a 0.5-inch diameter and a 0.1-inch thickness. This particular piezoelectric means 20 has a primary resonant frequency in one of its modes, i.e., the thickness mode, of approximately 700 kilohertz which is well above the minimum 100 kilohertz frequency range required for positive detection of particulate material in the fluid stream in accordance with the present invention. When transducer 20 is tuned by means of tuner 31 (e.g., Cambion 1505-6 tuning coil, which is preferably positioned within housing 15, see FIG. 2) to its primary resonant frequency of 700 kilohertz, the typical voltage response $v_a$ of transducer 20 approximates the curve illustrated in FIG. 4.

It will be noted that the response curve of the particular mentioned transducer shows two resonant frequencies, one at approximately 100 kilohertz which occurs in the radial mode of the piezoelectric means and another at approximately 700 kilohertz which occurs in the thickness mode of the piezoelectric means. The output signal generated by transducer 20 upon particulate material striking conduit 10 contains dominant frequency components in both the 100 kilohertz range and the 700 kilohertz range. However, since the output signal of transducer 20 generated by normal flow, pump noise, and/or other extraneous noises striking housing 15 may also contain dominant frequency components in the 100 kilohertz range, (in fact, in some experiments dominant background noise components have been experienced as high as 250 kilohertz) reliance upon the 700 kilohertz range is necessary to insure that particulate material is, in fact, present in the fluid stream. Output signals from transducer means 20 generated by normal flow, pump noise, etc., will not contain dominant frequency components in the 700 kilohertz range. Although circuitry 30 forms no part of the present invention, a brief description of the circuitry will be set forth for a more complete understanding of the invention. For a more detailed description of the circuitry which can be used to process the output of transducer 20, see copending application Ser. No. 297,097, filed Oct. 12, 1972, now U.S. Pat. No. 3,816,773.

Figure 5:
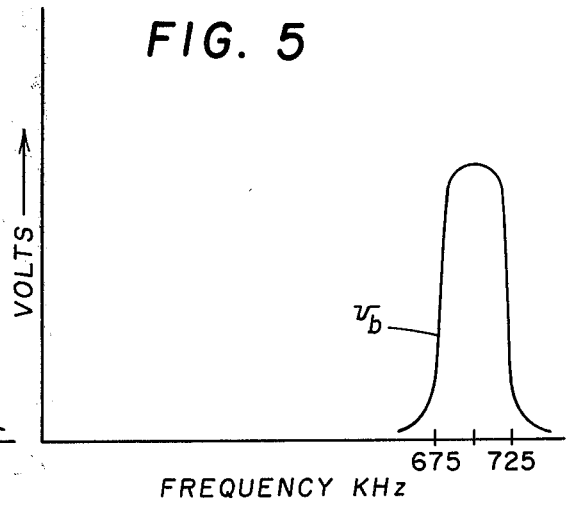
FIG. 5 is a graphic representation of the output signal of the transducer after it has passed through the filter of FIG. 1.

The output voltage $v_a$ of transducer 20 is tuned to approximately 700 kilohertz and is fed through standard high band-pass filter 32 which is designed to pass a narrow band of frequencies as small as feasible, e.g., approximately 50 kilohertz wide or less, centered about said tuned frequency of the transducer, i.e., filter 32 will pass a narrow band of frequencies from approximately 675 to 725 kilohertz while attenuating all the other frequencies. The smaller the band pass, the better monitoring capability the detection means has; however, the necessary amplification required increases as the band width decreases. The typical output signal $v_b$ of filter 32 is illustrated in FIG. 5. The output signal $v_b$ of filter 32 is then amplified by amplifier 33 which may consist of one or more stages as is well known in the art. It should be recognized that filter 32 may be placed as shown or placed subsequent to amplifier 33 without changing its function or purpose or, further, it may take the form of a feedback loop which attenuates the lower frequencies as is well known in the art.

The filtered and amplified signal is next passed through rectifier 34 to convert the AC signal to a DC voltage signal whose magnitude is the averaged rectified version of the output of amplifier 33. The signal is then directly recorded on a conventional DC recorder 35 and/or is fed to alarm circuit 36 which warns an operator when a certain condition related to particulate material content exists in the flow stream. In the illustrated alarm circuit 36, the signal originated by detection means 12 is applied to comparator 37 in which it is compared to a reference voltage signal $v_r$ which, in turn, is representative of some desired particulate content condition in the flow stream. If the reference signal $v_r$ is exceeded by the processed signal, comparator 37 will provide an error signal which in turn triggers alarm 45.

Figure 3:
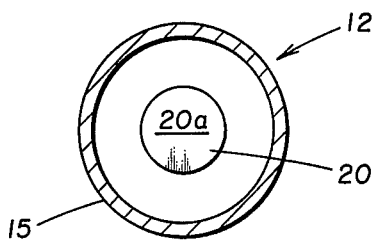
FIG. 3 is an elevated view, partly in section, taken along line 3—3 of FIG. 2.

To summarize the operation of detection means 12, the open end of housing 15 is placed on outer surface of conduit 10 at a substantial bend in said conduit. Housing 15 is placed so that the face 20a (FIG. 3) of transducer 20 will be as near perpendicular to the fluid stream in the conduit as is feasible. This is so that transducer 20 will have maximum sensitivity in its thickness mode to vibrations of conduit 10 caused by particulate material in the flow stream impinging with maximum impact on the inner surface of conduit 10 at said bend.

The particulate material, upon striking the inner surface of conduit 10, gives up kinetic energy which causes vibrations in conduit 10 at that point where said material impacts. These vibrations, through the oil within housing 15, excite transducer 20 which in turn generates an output signal representative of the kinetic energy given up by the impacting material. By processing the output signal as described above, the particulate material within the flow stream can be monitored.

The sensitivity of transducer 20 will depend in part on the thickness of the conduit wall, velocity of the flow stream, etc. The present invention has been used in sand monitoring of fluid streams in conduits having a wall thickness of 0.6 inch. Furthermore, although the present detection means 12 is primarily a device capable of detecting the presence or nonpresence of particulate material in a fluid stream, in certain instances, the output signal can be calibrated (by using known material concentrations at known flow rates) so that a quantitative measurement of material concentration can be made under certain conditions. Such measurements will normally be possible where heavy material concentrations are present in high velocity flow streams, such as is the case in oil well fracturing operations.

What is claimed is:

1. A means for detecting particulate material in a fluid stream which is flowing through a conduit comprising:
    a housing adapted to be positioned against the outside of said conduit;
    a transducer means responsive to acoustic energy to generate a signal representative of said energy;
    means for freely suspending said transducer means within said housing so that said transducer means does not contact said housing or said conduit when in an operable position and is free for relatively undampened vibration when excited by particulate material striking the inside of the conduit;
    means in said housing for allowing said housing to be filled with a noncompressible liquid; and
    output means for providing an output for said signal generated by said transducer means.

2. The detection means of claim 1 wherein said transducer means comprises:
    a piezoelectric means having a primary resonant frequency in excess of 100 kilohertz.

3. The detection means of claim 2 wherein said primary resonant frequency is approximately 700 kilohertz.

4. The detection means of claim 3 wherein said output means comprises:
    an electrical lead which also forms at least a part of said means for freely suspending said transducer in said housing.

5. The detection means of claim 3 including:
    a means within said housing for tuning said output signal to said primary resonant frequency of said transducer.

6. A means for detecting particulate material in a fluid stream flowing through a conduit having a substantial bend therein, said detection means comprising:
    a housing having an open end, said housing being adapted to be positioned with said open end in abutment with the outer surface of said bend in said conduit;
    a transducer means responsive to acoustic energy to generate a signal representative of said energy, said transducer comprising a piezoelectric means having a primary reference frequency in excess of 100 kilohertz;
    means for freely suspending said piezoelectric means in said housing so that said piezoelectric means does not contact said housing or said conduit and is free for relatively undampened vibration when excited by particulate material striking the inside of the bend;

means in said housing for allowing said housing to be filled with a noncompressible liquid when said housing is in place on said conduit; and output means for providing an output for said signal generated by said transducer means.

7. The detection means of claim 6 wherein said primary resonant frequency is approximately 700 kilohertz.

8. The detection means of claim 7 wherein said output means comprising:

an electrical lead which also forms at least a part of said means for freely suspending said transducer in said housing.

9. The detection means of claim 7 including:

a means within said housing for tuning said output signal to said primary resonant frequency of said transducer.

10. The detection means of claim 6 including:

a flexible membrane sealing said open end of said housing.

* * * * *